Aug. 17, 1926.

A. B. CLISSON 1,596,581

DOUBLE TANDEM PRESSING MACHINE

Filed August 9, 1924  3 Sheets-Sheet 1

INVENTOR.
Albert B. Clisson
BY
Parsons & Bodell
ATTORNEYS.

Aug. 17, 1926.
A. B. CLISSON
1,596,581
DOUBLE TANDEM PRESSING MACHINE
Filed August 9, 1924   3 Sheets-Sheet 2
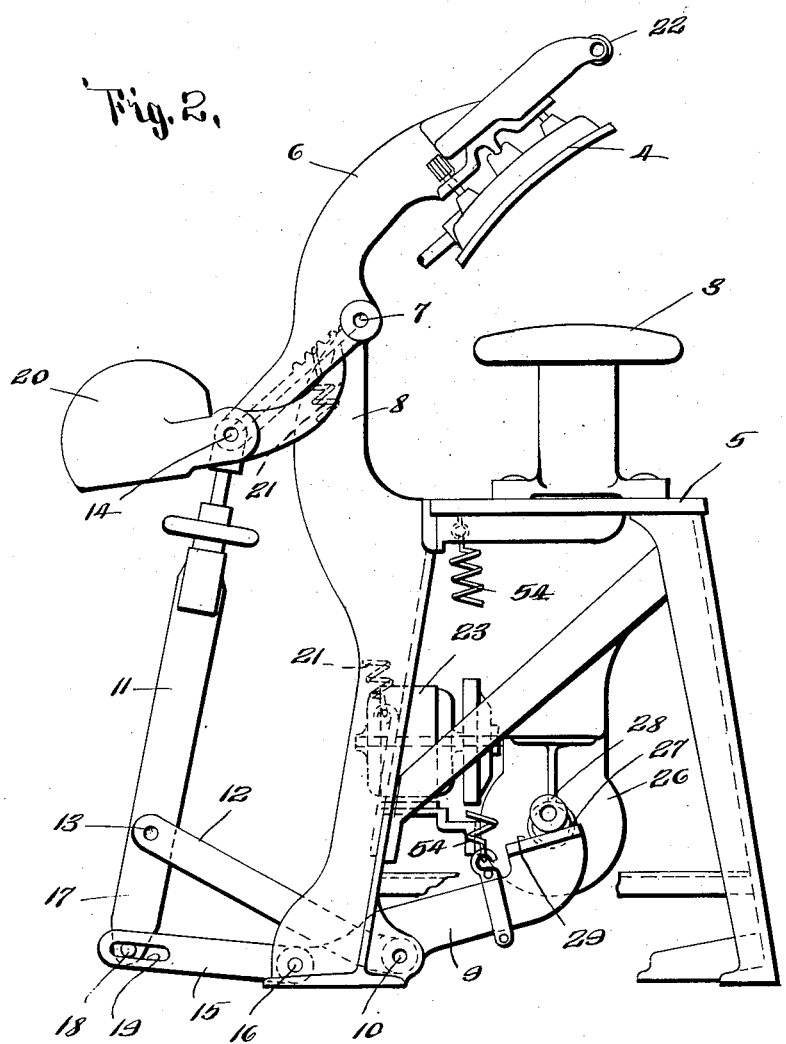

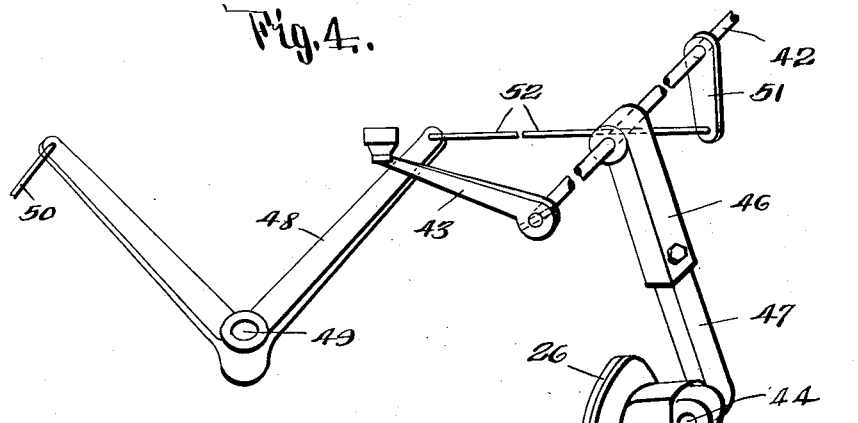
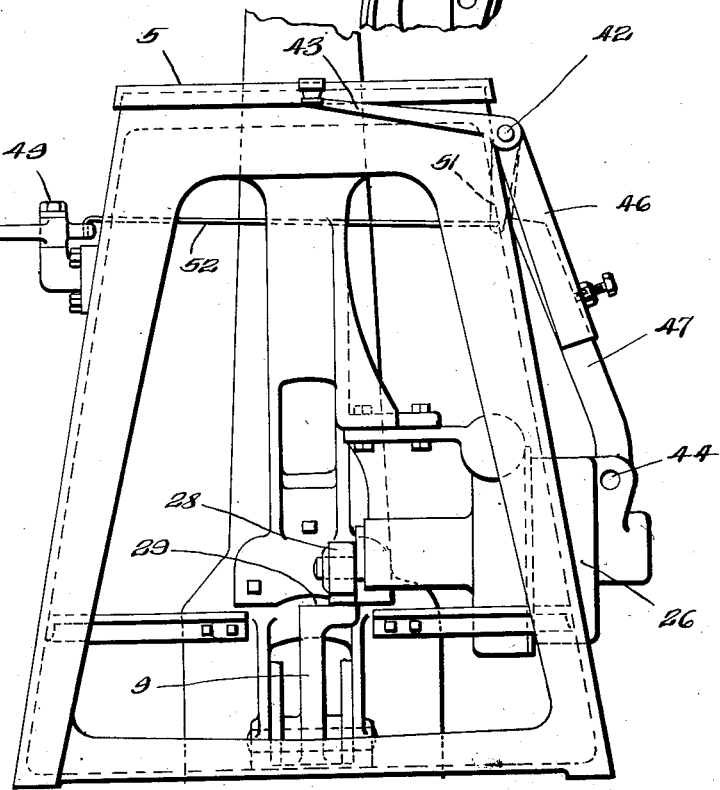

Patented Aug. 17, 1926.

1,596,581

UNITED STATES PATENT OFFICE.

ALBERT B. CLISSON, OF GEDDES, NEW YORK, ASSIGNOR, BY MESNE ASSIGNMENTS, TO LIBERTY NATIONAL BANK, TRUSTEE, OF SYRACUSE, NEW YORK.

DOUBLE TANDEM PRESSING MACHINE.

Application filed August 9, 1924. Serial No. 731,040.

This invention relates to garment and laundry pressing machines and has for its object a particularly simple and efficient means for connecting the machines in tandem, whereby when one machine is operated to close the machine, the other machine is operated to open, so that the machines alternately open and close.

The invention consists in the novel features and in the combinations and constructions hereinafter set forth and claimed and described.

In describing this invention, reference is had to the accompanying drawings in which like characters designate corresponding parts in all the views.

Figure 2, is a side elevation of one of the pressing machines.

Figure 3, is a front elevation, parts being omitted.

Figure 4, is a detail view of the operating means for each machine and the connections between the operating means of the machines.

Figure 1:
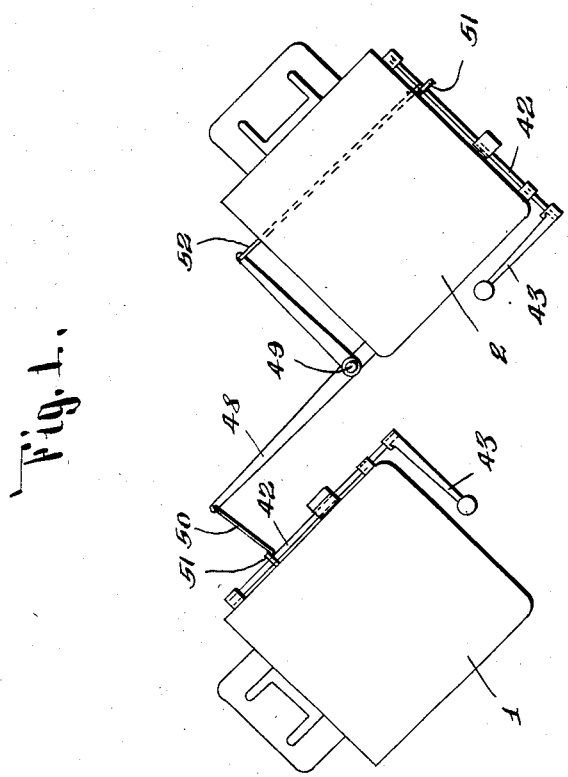
Figure 1, is a plan view of a pair of pressing machines embodying my invention. the machines being shown diagrammatically.

This invention comprises generally, a pair of pressing machines arranged adjacent to each other, each machine comprising cooperating pressing elements, one of which is movable toward and from the other, said movable elements being arranged to operate alternately, whereby when one pressing machine is closed, the other is open, power means for applying power to the movable element of each machine and for controlling the opening of such movable element, an operating or controlling member for each power means and connections between the operating members of each machine, and the operating members of the other machine.

The pressing machines, here shown are of the type in which the movable element is actuated from a power member or lever through connections which are normally out of motion transmitting relation and are movable into such relation by a preliminary movement of the movable element toward closed position and the power is applied to the movable element through a periodic clutch including a clutch section shiftable manually to its "in" position and automatically to its "out" position and held in its "in" position during a certain period sufficient to permit the press to close or to open; and each clutch is thrown into its operative position by a manually operated member. These operating members are connected together, whereby when one is actuated to effect the closing of the companion machine, the other is actuated to effect the opening of the other machine.

1 and 2 designate the pressing machines, the operating means of which are connected in tandem or in series. These machines may be of any suitable form, size and construction, those here shown each include a stationary lower pressing element or buck 3, a movable element or head 4, movable toward and from the buck 3 and the work thereon. the buck 3 being mounted on a suitable frame or table 5 and the head 4 being carried on the forward arm of a vertically movable yoke or lever 6 pivoted between its ends at 7 to the frame or a suitable standard 8 rising therefrom. The head 4 is actuated to apply pressure by a vertically movable power member or lever 9 pivoted between its ends at 10 to the lower end of the machine and motion transmitting means between the lever 9 and the head 4, this motion transmitting means including connections normally out of motion transmitting relation and movable into such relation by a preliminary manual movement of the head toward closed position.

In addition to the lever 6, these motion transmitting connections include toggle links 11 and 12 pivoted together at 13, the link 11 being pivoted at 14 to the rear arm of the yoke 6 and the lever 12 being pivoted to the frame preferably and for convenience only, on the same pivot 10 on which the power lever 9 is mounted.

In addition, this motion transmitting means includes a thrust link 15 pivoted at 16 to the rear arm of the power lever 9 and connected to the toggle links 11 and 12 by a lost motion or pin and slot connection, it being here shown as connected to an extension 17 of the link 11 by a pin and slot connection, the pin 18 of which is mounted on the end of the extension 17 and the slot 19 of which is formed in the link 15. The lever 6 is provided with a suitable counter balancing weight 20 and spring 21.

To close the machine, the operator takes hold of the handle 22 on the front arm of the yoke 6 and pulls down on the same, thus causing the toggle links 11 and 12 to move toward a straightened position and also carry the thrust link 15 from a horizontal into a nearly upright position, the pin 18 moving toward the lower end of the slot 19.

This preliminary closing movement preferably brings the head 4 so close to the work on the lower buck 3 that it is impossible for the operator to have his hands or fingers between the pressing elements at the time power can be applied. After the head 4 has been so preliminarily closed, the power is applied to the lever 9 causing the link 15, which is now upright, to move the toggle links 11 and 12 more nearly into a straight line and thus apply pressure to the head 4.

The construction of this mechanism forms no part of this invention.

Figure 5:
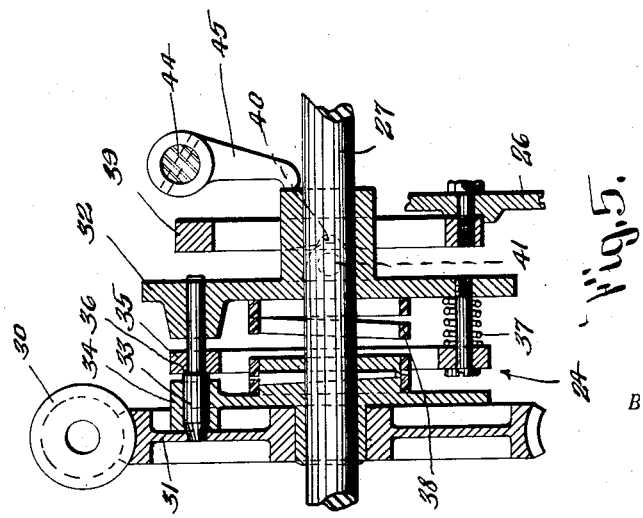
Figure 5, is a sectional view of the clutch of each machine.

The power is applied to the lever 9 of each machine from a constantly running electric motor 23, the motion of which is transmitted to the lever 9 through a periodic clutch 24, Figure 5 contained within the housing 26.

This motion transmitting means between the shaft of the motor 23 and the lever 9 comprises an intermittently rotatable shaft 27 journalled in the housing 26 and having a cam or eccentric 28 coacting with the face 29 on the lever 9. In addition, the motion transmitting means includes a worm 30 on the shaft of the motor and meshing with the worm gear 31, mounted on and rotatable relatively to the cam shaft 27 and a clutch 24 for connecting the worm gear 31 and the shaft 27.

This clutch includes a shiftable clutch section 32 mounted on and slidable axially of the shaft 27, clutch pins 33 movable by the section 32 into and out of holes in the web of the gear 31, a guide disk 34 having passages for guiding such pins, a compression disk 35 interposed between the guide disks 34 and the section 32 and shouldering against the annular shoulders 36 on the pins, springs 37 interposed between the disk 35 and the section 32, a main spring 38 tending to throw the clutch section 32 to its "out" position, manual means for throwing the clutch to its "in" position and a controlling cam for holding it in its "in" position.

In the illustrated embodiment of my invention, the shaft 27 and the clutch 24 make a half revolution during each operation and the means for controlling the clutch and the shaft through a half revolution comprises a cam 39 arranged concentric with the shaft 27 and supported within the housing 26, this cam having diametrically opposite notches 40 for receiving followers 41 carried on the clutch section 32. In operation, the followers 41 are normally arranged in the notches. Upon the shifting of the clutch section 32 to its "in" position, these followers are shifted out of the notches and upon initial rotation of the section 32, carried on to the high faces of the cam and hence hold the section 32 in its "in" position, until the clutch makes a half revolution and the followers again brought into alinement with the notches. The springs 37 permit the pins 33 to yield in case they are not initially alined with the holes of the web of the worm gear 31, and to thrust such pins into holes when they come into alinement with the holes. The ends of the clutch pins 33 and the holes in the web of the wheel 31 are suitably tapered to cause the pins to readily release when the followers of the section 32 come into alinement with the notches 40 of the cam 39.

The construction of the clutch forms no part of this invention, it being sufficient to bear in mind, that the clutch is a half revolution clutch.

The means for shifting the clutch to its "in" position, includes a manually operated rock shaft 42 mounted on the frame of each machine and having a handle 43 for rocking it. A second rock shaft 44 carried by the clutch housing 26 and having a shifter arm 45 thrusting against the end of the hub of the clutch section 32, a rock arm 46 mounted on the shaft 42 and coacting with the rock arm 47 on the shaft 44. The arm 46 is shaped to house the arm 47 and contains a ratchet mechanism, by which when the handle lever 43 is depressed, to rock the shaft 43 in a counter clockwise direction, the arm 46 is also rocked and through the ratchet mechanism rocks the arm 47 and the shaft 44 in a clockwise direction, to shift the shiftable section 32 to its "in" position. After this section has been moved to its "in" position, the ratchet mechanism releases itself, so that the clutch is free from the control of the handle 43, in the event, that the operator holds his hand on the handle 43. The construction of the operating mechanism per se forms no part of this invention.

This invention comprises connections between the operating means of these pressing machines, whereby the operation of the handle lever 43 of one machine to apply the power to the element for such machine also actuates the operating shaft 42 of the other machine to release the pressing head 4 of such machine from the power mechanism, so that the head thereof will open.

These connections as here shown, comprise a lever as an angle lever 48 pivoted at 49 to the frame of one machine, one arm of the angle lever being connected by a link 50 to a rock arm 51 on the rock shaft 42 of one machine and the other arm of the bell crank lever being connected by a link 52 to a rock arm 51 on the rock shaft 42 of the other machine.

Assuming that the head of machine No. 1 is open and the head of machine No. 2 is closed; upon preliminarily closing of the head of machine No. 1 and upon the depressing of the handle 43 of machine No. 1, the rock shaft 42 is rocked in a counter clockwise direction, thus throwing the clutch section 32 of such machine to its "in" position, whereupon the rock shaft 27 and cam 28 make a half revolution from the position shown in Figure 1 applying power to the lever 9 and to the head of machine No. 1 through the motion transmitting mechanism which has been brought into motion transmitting relation by the preliminary closing of the head 4 of machine No. 1.

The rocking of the shaft 42 of machine No. 1 is transferred through the link 50, bell crank lever 48 and link 52 to the rock shaft 42 of machine No. 2 throwing the clutch section 32 of machine No. 2 into its "in" position, so that the cam 28 of such machine makes a half revolution and permits the head to open. The cam of the machine No. 2 is in the diametrically opposite position from that shown in Figure 2 and moves into the position shown in Figure 2. The lever 9 of each machine is caused to follow the cam by a spring 54.

Thus lever 43 of each machine controls the closing of such machine and the opening of the other machine and the operator while operating the lever 43 to close one machine, automatically operates the lever of the other machine to cause it to open.

What I claim is:

1. The combination of a pair of pressing machines, each comprising cooperating pressing elements, one movable toward and from the other, the movable elements being arranged to operate alternately, whereby when one pressing machine is closed the other is open, power mechanism for applying pressure to the movable element of each machine and operating means for controlling the opening of the movable element and the application of power thereto comprising an operating member and connections between the operating member of one machine with the operating member of the other machine.

2. The combination of a pair of pressing machines, each comprising cooperating pressing elements, one movable toward and from the other, the movable elements being arranged to operate alternately whereby when one pressing machine is closed, the other is open, power mechanism for applying pressure to the movable element of each machine and operating means for controlling the opening of the movable element and the application of power thereto comprising an operating member and a motion transmitting member operated by the operating member and connections between the motion transmitting members of the machines whereby the motion transmitting member of either machine is actuated by the operating member of the other machine.

3. The combination of claim 1 in which the power mechanism of each machine includes a periodic clutch shiftable into engaged position to close the press and into engaged position to open the press and automatic means for controlling the period of engagement of the clutch, in which the operating means is connected to the shiftable clutch section to shift it into engaged position and in which the connections between the operating member of one machine and that of the other machine operates to shift the clutch of the latter whereby when the clutch of one machine is shifted into engaged position to close the corresponding press, the clutch of the other machine is shifted into engaged position to open the press of said other machine.

In testimony whereof, I have hereunto signed my name, at Syracuse, in the county of Onondaga, and in the State of New York, this 28th day of July 1924.

ALBERT B. CLISSON.